Sept. 27, 1960 H. VANDER MOLEN Re. 24,874

CRUTCH

Original Filed Feb. 21, 1955

INVENTOR.
Herman VanderMolen
BY-
Frank E. Liverance, Jr.
Attorney

United States Patent Office

Re. 24,874
Reissued Sept. 27, 1960

24,874

CRUTCH

Herman Vander Molen, Grand Rapids, Mich., assignor to Cycle Crutch Company, Grand Rapids, Mich., a corporation of Michigan Original No. 2,797,698, dated July 2, 1957, Ser. No. 489,522, Feb. 21, 1955. Application for reissue Apr. 27, 1959, Ser. No. 809,327

3 Claims. (Cl. 135—49)

Matter enclosed in heavy brackets [ ] appears in the original patent but forms no part of this reissue specification; matter printed in italics indicates the additions made by reissue.

This invention relates to a novel and especially useful crutch. It is a primary object and purpose of the present invention to provide a crutch of novel structure which, in a very simple and practical way, makes for ease in use of crutches, facilitates their operation and insures against backward forces causing the user of the crutches to fall backward or tend to fall in such direction. Instead, the crutches cooperate with the action of one using them to cause the user to tend to tilt forwardly rather than backward thus avoiding accidents, lessening strain upon the user and greatly easing crutch operation.

An understanding of the invention may be had from the following description, taken in connection with the accompanying drawing, in which, Fig. 1 is an elevation of the crutch made in accordance with my invention.

Like reference characters refer to like parts in the different figures of the drawing.

In the structure of the crutch which I have devised, a longitudinal upright 1 preferably of light metal tubular form, adjacent its lower end and a short distance above such lower end is bent laterally for a short distance at 2 and terminates in a downwardly extending end portion 3 over which a suitable rubber or rubber composition foot 4 is placed, being usually desirably connected therewith so as to be easily removed for replacement.

Figure 1:
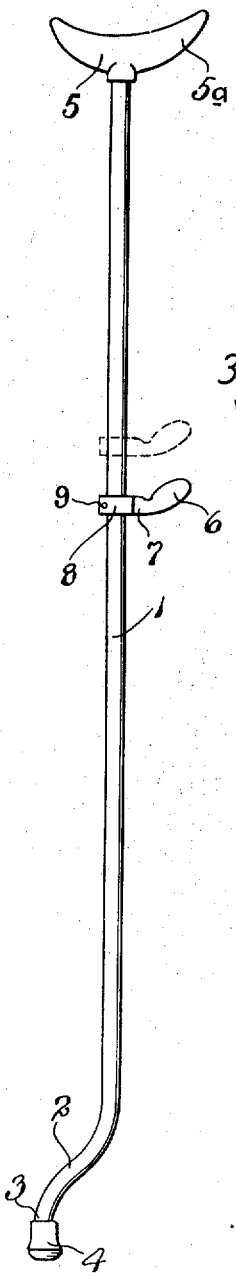
Figure 2:
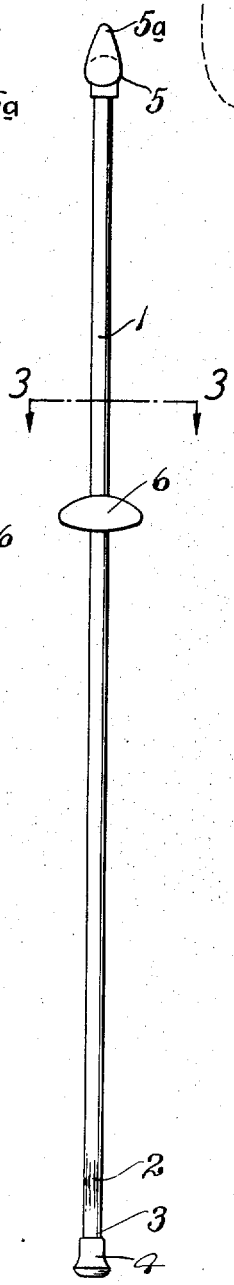
Fig. 2 is an elevation at right angles to that shown in Fig. 1.
Figure 3:
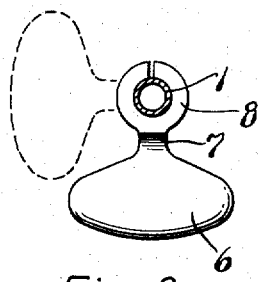
Fig. 3 is a somewhat enlarged transverse section and plan view, the section being taken on the plane of line 3—3 of Fig. 2 looking downwardly.
Figure 4:
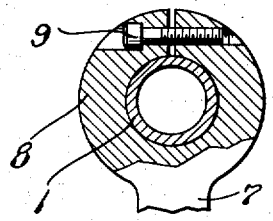
Fig. 4 is an enlarged horizontal section through the adjustable attachment of a handle to the upright member of the crutch.
Figure 5:
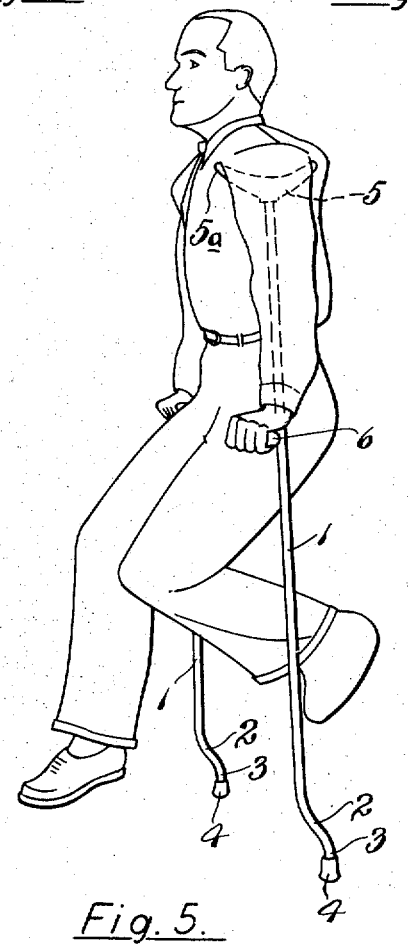
Fig. 5 shows in perspective the use of a pair of such crutches in service.

At the upper end of the rod 1 an armpit engaging member 5 is secured which, being of a shallow arc form as shown, lies in generally the same vertical plane as the laterally extending portion 2 at the lower end of the crutch. Such member 5 at the upper end of the crutch as in use is placed underneath the body at the armpit as shown in Fig. 5. One portion, the front portion when in use, of such member 5, at 5a, is longer than the opposite portion thereof and curves upwardly to a higher level than the opposite portion, which not only insures that such member 5 will be properly placed underneath the arm at the armpit but also helps to further insure that there will be no disengagement when used.

Between the upper and lower ends of the rod 1 a handle 6 is adjustably secured to be engaged and pressed downwardly upon by the hand of the user. As one means of thus securing the handle, the shank 7 thereof terminates in a split collar 8 which is clamped by a set screw 9 in any position in the length of the rod 1 desired. It is also evident that by this structure not only vertical adjustment is obtained but that the handle can be turned to different radial positions around the rod. Such form of adjustment in itself is not essential to the invention as many other ways of attaining such double adjustment are available to those skilled in the art.

In Fig. 5 the use of a pair of such crutches is shown. The members 5 underneath the arms of the user and with the longer higher front end portions 5a thereof extending forwardly, positions the crutches so that the bent sections 2 extend to the rear. Such rearward extension has proven to be of great utility. There is an insurance against backward tipping or a tendency to such movement and an ease of forward movement, the upper portion of the body of the user moving forwardly and having such movement accentuated by the location of the floor or ground engaging foot members 4 back of the longitudinal axis of the bodies of the rods 1. Both of such rearward extensions 2 on a pair of crutches used are located in substantially parallel vertical planes, which are symmetrical with the central vertical plane of the body of the one using the crutches. Such crutches have been made and thoroughly tested and have proved exceptionally desirable in use.

The invention is defined in the appended claims and is to be considered comprehensive of all forms of structure coming within their scope.

I claim:

1. In a crutch, an elongated vertical rod having at its lower end portion a short rearwardly offset section terminating in a reversely curved short generally vertical terminal portion, the lower end of which is adapted to bear against the ground, floor, or the like, and an armpit engaging member, concave at its upper side, secured at the upper end of said rod and located generally in the same vertical plane with said lower offset section of said rod, having a front portion thereof extending in front of the upper end of the rod a greater distance than the rear end portion thereof extends back of the upper end of said rod.

2. In a crutch structure including an elongate main body having at its upper end a concave armpit-engaging member, said armpit-engaging member having its greater length forwardly of the axis of said main body and curved upwardly above its rear portion, the lower end portion of said elongate body being rearwardly bent and terminating in a foot support positioned substantially rearward of the axis of said main body portion, and an adjustable handhold fixed to said main body and projecting forwardly thereof, said handhold having its forward position relatively wide and extending laterally at each side of said main body, the upper surface of said handhold being generally oval with its medial portion raised and its lateral portions curved downwardly to its ends.

*3. A crutch including an elongated main body, the lower end portion of said elongated body being rearwardly bent and terminating in a foot support the end of which is positioned substantially rearward of the axis of said main body portion defining the perpendicular line of force extending toward the ground, support means at the top of said elongated body, and a handhold secured to said main body between said rearwardly bent lower end portion and said top support means, said handhold extending forwardly of said elongated body, being relatively wide and extending laterally at each side of said elongated body.*

References Cited in the file of this patent or the original patent

UNITED STATES PATENTS

| | | |
|---|---|---|
| D.170,437 | Wood | Sept. 15, 1953 |
| 869,128 | Autenrieth | Oct. 22, 1907 |
| 2,312,786 | Wilson | Mar. 2, 1943 |
| 2,388,778 | Wheeler | Nov. 13, 1945 |
| 2,426,594 | Buell et al. | Sept. 2, 1947 |
| 2,552,902 | Miley | May 15, 1951 |
| 2,568,654 | Neptune | Sept. 18, 1951 |
| 2,690,188 | Goddard | Sept. 28, 1954 |
| 2,707,478 | Davies | May 3, 1955 |